Feb. 2, 1926.

I. P. HAYES

POULTRY FEEDER

Filed Oct. 10, 1925

1,571,409

INVENTOR
Ira P. Hayes
BY Chappell & Earl
ATTORNEYS

Patented Feb. 2, 1926.

1,571,409

UNITED STATES PATENT OFFICE.

IRA P. HAYES, OF ECKFORD, MICHIGAN.

POULTRY FEEDER.

Application filed October 10, 1925. Serial No. 61,694.

*To all whom it may concern:*

Be it known that I, IRA P. HAYES, a citizen of the United States, residing at Eckford, county of Calhoun, State of Michigan, have invented certain new and useful Improvements in Poultry Feeders, of which the following is a specification:—

This invention relates to improvements in poultry fountains.

The main object of this invention is to provide a poultry fountain which may be formed of earthenware and which is well adapted for the handling of milk and the like and not likely to become clogged by curdling of the milk.

A further object is to provide an improved poultry fountain having these advantages and which also can be filled and adjusted to position without danger of dropping the parts or the parts slipping from proper relation and without spilling the contents.

Objects relating to details and economies of contruction and operation of my invention will definitely appear from the detailed description that follows.

The invention is clearly defined and pointed out in the claims.

A structure which is a preferred embodiment of my invention is clearly illustrated in the accompanying drawing, forming a part of this application, in which.

In the drawing similar reference characters refer to similar parts throughout the several views.

Figure 1:
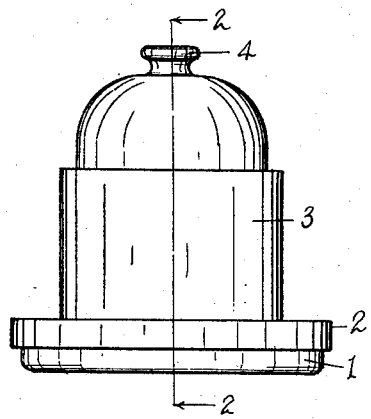
Fig. 1 is a side elevation of a poultry fountain embodying the features of my invention.

Referring to the drawing, my improved fountain comprises a trough 1 having sides 2, the inside of which is preferably flared upwardly. This is preferably formed of earthenware as is also the reservoir 3, this reservoir having a handle 4 at the top and being open at the bottom.

The pan has inwardly projecting integral lug-like rests 5 on its side walls, uniformly spaced, there being three in the structure illustrated. The diameter of the reservoir is such as to loosely fit between these lugs as shown in the drawing.

Figure 5:
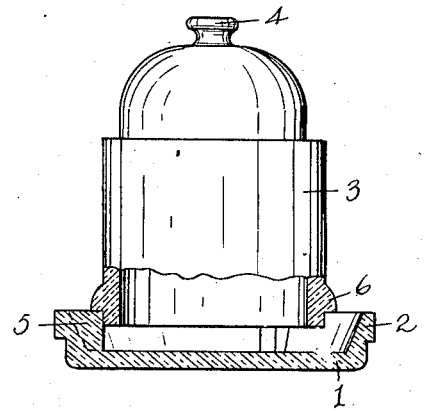
Fig. 5 is a detail view partially in section showing the reservoir adjusted to feeding position.
Figure 4:
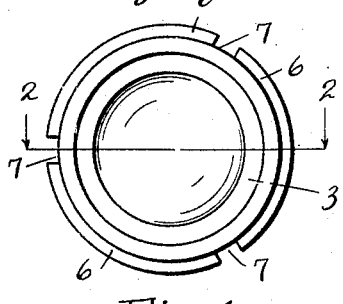
Fig. 4 is an inverted view of the reservoir.

The reservoir has a supporting rib 6 spaced from its lower edge and notched at 7, the notches spaced so that all may be brought into register with the rests to permit the reservoir being lowered so that it rests upon the bottom of the trough. The reservoir may, however, be raised as shown in Fig. 5 and revolved so that the ribs 6 will rest upon the rests 5 supporting the reservoir with the lower edge in elevated relation to the bottom of the pan, the reservoir however, still being centered by the rests as its lower end is between the rests when in this elevated position.

Figure 2:
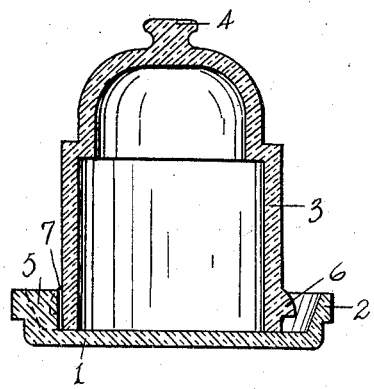
Fig. 2 is a vertical section on a line corresponding to line 2—2 of Figs. 1, 3 and 4 with the reservoir in non-feeding or handling position.
Figure 3:
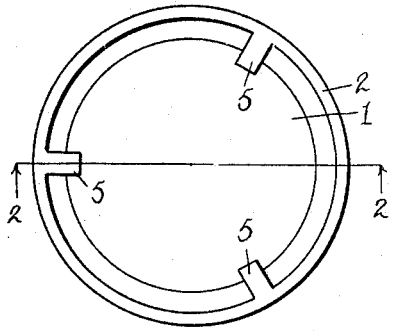
Fig. 3 is a plan view of the trough.

By thus arranging the parts, the reservoir may be removed and filled in inverted position, the trough placed thereon as a cover with the rests engaging the notches as shown in Fig. 2 and the fountain easily carried about and inverted without danger of spilling the contents. Also the reservoir and trough are held in engagement so that there is little likelihood of the parts slipping out of place or the fountain being dropped. After the fountain has been inverted the reservoir may be raised and turned to engage the rib with the rests thereby supporting the reservoir in elevated feeding position, and at the same time it is properly supported.

My improved fountain is especially designed by me for the feeding of sour milk, mash and other materials which necessitates frequent cleaning and sterilizing to keep in sanitary condition. The parts may be readily formed of earthenware which is easily kept in sanitary condition.

Having thus described my invention, what I claim as new and desire to secure by Letters Patent, is:

1. In a poultry fountain, the combination of a pan-like trough of earthenware having spaced integral rests projecting inwardly from the side wall thereof, and a reservoir of earthenware open at the bottom and having an annular external rib spaced from its lower edge and having notches therein spaced to receive said rests when brought into register therewith permitting the reservoir to rest on the bottom of the trough, said rib being adapted to engage said rests to support the reservoir with its lower edge in spaced relation to the bottom of the trough, the rests engaging the sides of the reservoir constituting positioning means for the reservoir.

2. In a poultry fountain, the combination of a pan-like trough having a plurality of projecting inwardly spaced rests, and a reservoir open at the bottom and having segmental supports spaced from its lower edge to engage said rests and spaced from each other to receive said rests permitting the reservoir to rest on the bottom of the trough, the rests engaging the sides of the reservoir constituting positioning means for the reservoir.

In witness whereof I have hereunto set my hand.

IRA P. HAYES.